United States Patent
Fu et al.

(10) Patent No.: US 11,992,021 B2
(45) Date of Patent: May 28, 2024

(54) LIQUID CREAMER, METHOD OF MAKING, AND BEVERAGE CONTAINING SAME

(71) Applicant: SOCIETE DES PRODUITS NESTLE S.A., Vevey (CH)

(72) Inventors: Jun-Tse Ray Fu, Dublin, OH (US); Alexander A Sher, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 484 days.

(21) Appl. No.: 17/293,593

(22) PCT Filed: Nov. 7, 2019

(86) PCT No.: PCT/EP2019/080523
§ 371 (c)(1),
(2) Date: May 13, 2021

(87) PCT Pub. No.: WO2020/099232
PCT Pub. Date: May 22, 2020

(65) Prior Publication Data
US 2022/0000133 A1   Jan. 6, 2022

Related U.S. Application Data

(60) Provisional application No. 62/767,008, filed on Nov. 14, 2018.

(30) Foreign Application Priority Data

Feb. 5, 2019   (EP) .................................. 19155440

(51) Int. Cl.
*A23C 11/02*   (2006.01)
*A23L 27/30*   (2016.01)
(Continued)

(52) U.S. Cl.
CPC .............. *A23C 11/02* (2013.01); *A23L 27/34* (2016.08); *A23L 27/36* (2016.08); *A23L 29/04* (2016.08); *A23L 29/272* (2016.08)

(58) Field of Classification Search
CPC ........ A23C 11/02; A23L 29/04; A23L 29/272; A23L 27/34; A23L 27/36
See application file for complete search history.

(56) References Cited

U.S. PATENT DOCUMENTS

2002/0037353 A1*   3/2002   Villagran ................. A23L 2/38
                                                          426/590
2014/0037825 A1*   2/2014   Napolitano ............ A23C 11/04
                                                          426/597
(Continued)

FOREIGN PATENT DOCUMENTS

RU       2420084 C2     6/2011
WO    2011064093 A1     6/2011
(Continued)

OTHER PUBLICATIONS

Galun, "Commodity Research and Examination of Food Products of Animal Origin", 2012, pp. 12-13, Retrieved from the Internet : <https://core.ac.uk/download/pdf/73978319.pdf>.
(Continued)

*Primary Examiner* — Anthony J Weier
(74) *Attorney, Agent, or Firm* — K&L Gates LLP

(57) ABSTRACT

The present invention relates to creamers for food products such as coffee and tea. In particular, the invention relates to a liquid creamer including casein based protein, pea protein, gellan gum, bicarbonate, citrate and oil. Further aspects of the invention are a beverage including a liquid creamer and a process for preparing a liquid creamer.

18 Claims, 1 Drawing Sheet

(51) Int. Cl.
A23L 29/00 (2016.01)
A23L 29/269 (2016.01)

(56) References Cited

U.S. PATENT DOCUMENTS

| | | | | |
|---|---|---|---|---|
| 2014/0044855 | A1* | 2/2014 | Sher | A23C 11/08 |
| | | | | 426/597 |
| 2015/0056360 | A1* | 2/2015 | Beeson | A23L 2/66 |
| | | | | 426/654 |
| 2015/0086700 | A1* | 3/2015 | Beeson | A23G 1/56 |
| | | | | 426/597 |
| 2016/0015049 | A1* | 1/2016 | Kapchie | A23F 3/163 |
| | | | | 426/597 |
| 2016/0198731 | A1* | 7/2016 | Daenzer-Alloncle | ......... |
| | | | | A23D 7/003 |
| | | | | 426/595 |

FOREIGN PATENT DOCUMENTS

| | | | |
|---|---|---|---|
| WO | 2012143515 | A1 | 10/2012 |
| WO | 2017134253 | A1 | 8/2017 |
| WO | 2017162701 | | 9/2017 |
| WO | 2017216194 | | 12/2017 |

OTHER PUBLICATIONS

Office Action Received for Application No. RU2021102058, dated Apr. 13, 2023, 10 Pages (Official Copy Only).

* cited by examiner

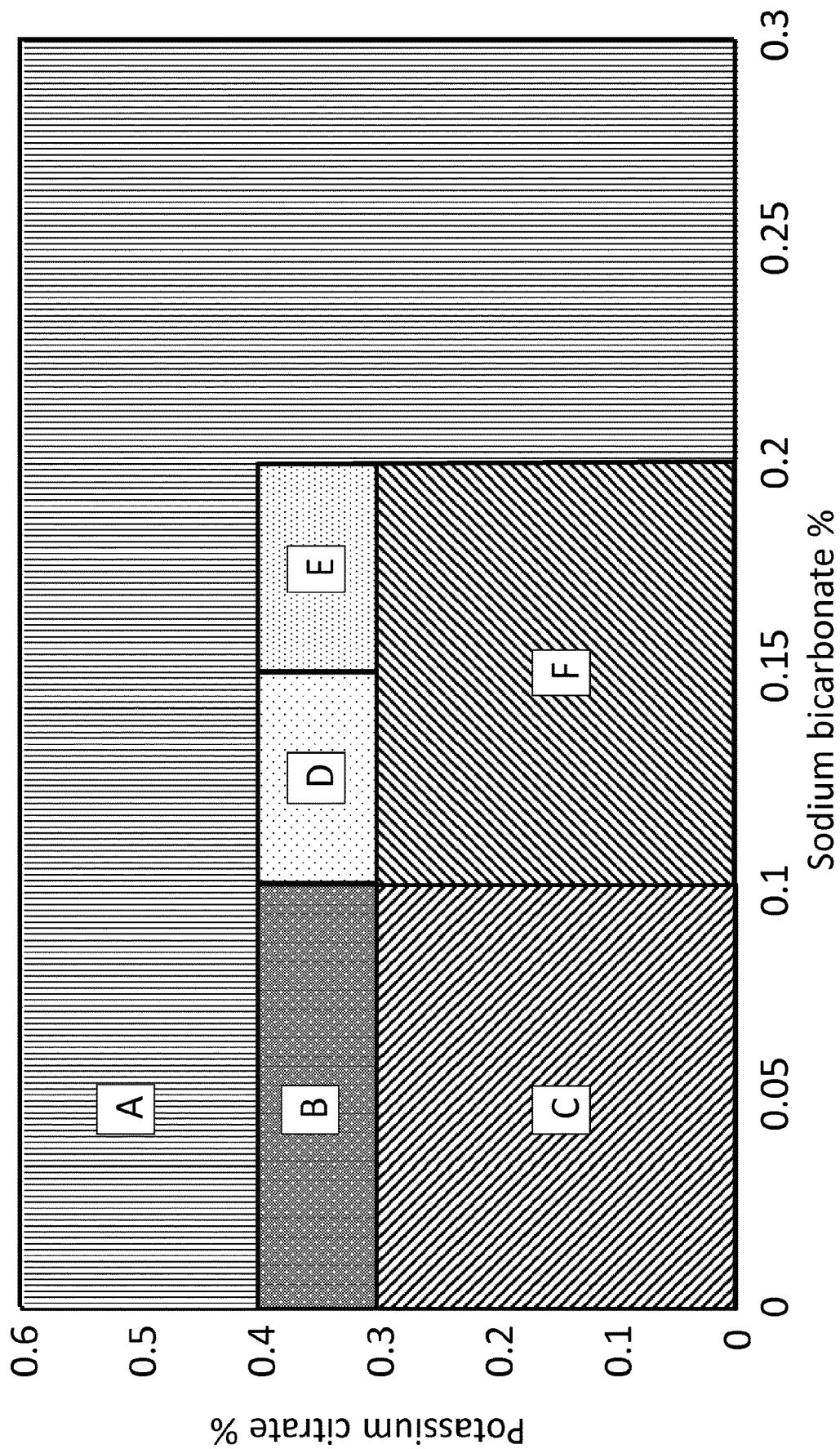

US 11,992,021 B2

LIQUID CREAMER, METHOD OF MAKING, AND BEVERAGE CONTAINING SAME

CROSS REFERENCE TO RELATED APPLICATIONS

The present application is a National Stage of International Application No. PCT/EP2019/080523, filed on Nov. 7, 2019, which claims priority to U.S. Provisional Patent Application No. 62/767,008, filed on Nov. 14, 2018 and European Patent Application No. 19155440.1, filed on Feb. 5, 2019, the entire contents of which are being incorporated herein by reference.

FIELD OF THE INVENTION

The present invention relates to creamers for food products such as coffee and tea. In particular, the invention relates to a liquid creamer comprising casein based protein, pea protein, gellan gum, bicarbonate, citrate and oil. Further aspects of the invention are a beverage comprising a liquid creamer and a process for preparing a liquid creamer.

BACKGROUND OF THE INVENTION

Creamers are widely used as whitening agents with hot and cold beverages such as, for example, coffee, cocoa, malt beverages and tea. They are commonly used in place of milk and/or dairy cream. Creamers may come in a variety of different flavours and provide mouthfeel, whitening, body, and a smooth texture. Creamers can be in liquid or powder forms. A liquid creamer may be intended for storage at ambient temperatures or under refrigeration, and should be stable during storage without phase separation, creaming, gelation, sedimentation or development of undesirable flavours. The liquid creamer should also retain a constant viscosity over time. When added to cold or hot beverages the liquid creamer should disperse rapidly, provide a good whitening capacity, and remain stable with no feathering and/or sedimentation while providing a superior taste and mouthfeel.

Soy lecithin has been used for many years as an emulsifier. However, some consumers would prefer not to consume products containing soy ingredients, for example due to a desire to avoid eating ingredients that may originate from genetically modified crops. This desire to avoid genetically modified ingredients can lead to even non-genetically modified ingredients (e.g. non GMO soy) being avoided by association. Some consumers may also suffer from allergies to soy in food.

More and more consumers are concerned by synthetic or artificial additives in food products. Thus, there is a demand for commercially available liquid creamers which are free from synthetic ingredients or ingredients that the consumer may perceive as synthetic. Many consumers would prefer not to consume products containing synthetic emulsifiers or phosphate buffers. However, these are typically needed to guarantee the physical stability of the liquid creamer over the shelf life of the product and after pouring into coffee. In addition, they are needed to achieve the desired whitening and texture/mouthfeel effect in the coffee.

Many liquid creamers experience physical separation in low pH and high mineral content beverages, especially when added to high temperature beverages. The physical separation is often referred to as flocculation, curdling, clumping, aggregation or sedimentation. This phenomenon is related first to the discharge of emulsion droplets then the aggregation of the droplets. There is a need to provide liquid creamers that have an ingredient list attractive to consumers and yet are stable during shelf life and provide good sensorial properties without any physical instability when added to beverages. In addition, the liquid creamer must perform well when added to beverages brewed by consumers using water with a wide range of different hardness levels (for example water with different levels of dissolved calcium and magnesium).

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to".

SUMMARY OF THE INVENTION

An object of the present invention is to improve the state of the art and to provide an improved solution to overcome at least some of the inconveniences described above or at least to provide a useful alternative. The object of the present invention is achieved by the subject matter of the independent claims. The dependent claims further develop the idea of the present invention.

Accordingly, the present invention provides in a first aspect a liquid creamer comprising casein based protein, pea protein, gellan gum, bicarbonate, citrate and oil wherein the casein based protein is present at a level between 0.7 and 1.4%, the pea protein is present at a level between 0.07 and 0.4%, the gellan gum is present at a level between 0.025 and 0.045%, the bicarbonate is present at a level between 0.07 and 0.15%, the citrate is present at a level between 0.18 and 0.24%, and the oil is present at a level between 6 and 12%; all percentages being as a weight percentage of the liquid creamer.

In a second aspect, the invention provides a beverage comprising the liquid creamer of the invention. A third aspect of the invention relates to a process of preparing the liquid creamer of the invention comprising: dissolving the ingredients as defined in claim 1 in hot water under agitation; sterilizing the composition using ultra-high temperature (UHT) treatment; homogenizing the composition; wherein the homogenization is performed before UHT treatment, after UHT treatment, or before and after UHT treatment.

It has been surprisingly found by the inventors that pea proteins in combination with casein based protein at a specific range of concentrations and in combination with bicarbonate and citrate as buffers provided good shelf life stability for liquid creamers.

The liquid creamer composition did not compromise texture and whitening capacity when added to hot coffees. Similar creamer behavior was found when added to hot tea. Additionally, the whitened coffee and tea had no instability issues such as feathering and/or de-oiling. The liquid creamer composition of the invention may be used with water with a wide range of different hardness levels (for example water with different levels of dissolved calcium and magnesium). Casein based protein or pea protein alone do not provide acceptable results in liquid creamers without the inclusion of emulsifiers such as mono- and di-glycerides or esters of these. It is surprising that the combination of casein based protein and pea protein provide good functionality in the complex liquid creamer matrix, giving stable oil-inwater emulsions with good whitening capabilities over a shelf-life of many months. In particular it is surprising that a combination of gellan gum and pea protein provides good functionality in liquid creamers containing caseinate, giving good tasting, stable oil-in-water emulsions with good whitening capabilities over a shelf-life of many months, for example without the need for low molecular mass emulsifiers. The combination of casein based protein and pea protein is further enhanced in combination with bicarbonate and citrate at specific concentrations.

BRIEF DESCRIPTION OF THE DRAWINGS

FIG. 1 is a graphical representation of an evaluation of liquid creamers, varying the ratio between sodium bicarbonate and potassium citrate. Regions A-F as discussed in Example 12.

DETAILED DESCRIPTION OF THE INVENTION

Consequently the present invention relates in part to a liquid creamer comprising casein based protein, pea protein, gellan gum, bicarbonate, citrate and oil wherein the casein based protein is present at a level between 0.7 and 1.4% (for example between 0.9 and 1.2%), the pea protein is present at a level between 0.07 and 0.4% (for example between 0.1 and 0.4%, for further example between 0.2 and 0.3%), the gellan gum is present at a level between 0.025 and 0.045% (for example between 0.030 and 0.040%), the bicarbonate is present at a level between 0.07 and 0.15% (for example between 0.08 and 0.12%), the citrate is present at a level between 0.18 and 0.24% (for example between 0.19 and 0.22%), and the oil is present at a level between 6 and 12%; all percentages being as a weight percentage of the liquid creamer. The combination of pea protein, gellan gum, bicarbonate and citrate at the claimed levels provides a casein based protein (for example caseinate) creamer emulsion with good taste, stability and texture. Good stability can be achieved without the creamer being too thick to pour easily, or forming a gel.

Liquid creamers are used as whitening agents and texture/mouthfeel modifiers to enhance hot and cold beverages such as tea, coffee, cocoa and malted beverages, but may also be used in other food applications such as soups. They are available in a range of flavours to complement the beverage to which they are added and are also convenient for people who do not have a ready supply of fresh milk or who choose not to consume milk.

In the context of the present invention, casein based protein refers to materials which are predominantly comprised of casein. In an embodiment, the casein based protein is selected from the group consisting of caseinate, micellar casein and combinations of these. The casein based protein may be caseinate. The caseinate may for example be sodium caseinate, potassium caseinate or calcium caseinate.

The pea protein according to the invention may be pea protein isolated from or extracted from green, yellow or purple peas (Pisum sativum). The pea protein may be pea protein fraction. The pea protein may be from the seeds of green peas. For example, the pea protein may be a vegetable protein material isolated from pea with a protein content greater than 80% on a dry weight basis. The pea protein may be a partially hydrolysed pea protein.

Advantageously, the liquid creamer of the invention is stable without requiring emulsifiers that may be badly perceived by consumers. In an embodiment, the liquid creamer contains less than 0.001 wt. % of monoacylglycerols (MAG), diacylglycerols (DAG) and diacetylated tartaric acid esters of monoglycerides (DATEM). For example, the liquid creamer may contain less than 0.0001 wt. % of MAG, DAG and DATEM. The liquid creamer of the invention may be free from added MAG, DAG and DATEM. By the term "free from added" is meant that the creamer composition does not contain any MAG, DAG or DATEM which have been added as such or are in amounts sufficient to substantially affect the stability of the creamer emulsion. A creamer free from added MAG, DAG and DATEM may contain minor amounts of these emulsifiers which do not substantially affect the stability of the emulsion, but which are present e.g. as minor impurities of one or more of the ingredients of the liquid creamer. For example, vegetable oils may naturally contain small amounts of monoacylglycerols and diacylglycerols. The liquid creamer of the invention may be free from MAG, DAG and DATEM. Monoacylglycerols are also known as monoglycerides and diacylglycerols are also known as diglycerides.

In an embodiment, the liquid creamer contains less than 0.001 wt. % (for example less than 0.0001 wt. %) of low molecular weight emulsifiers. In the context of the present invention the term low molecular mass emulsifiers refers to emulsifiers with a molecular mass below 1500 Dalton. Casein based proteins according to the invention are not low molecular mass emulsifiers. The liquid creamer of the invention may be free from added low molecular mass emulsifiers, for example the liquid creamer of the invention may be free from low molecular mass emulsifiers. Low molecular mass emulsifiers include, but are not limited to, monoacylglycerols, diacylglycerols, diacetylated tartaric acid esters of monoglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, succinic acid esters of monoglycerides and diglycerides, lactic acid esters of monoglycerides and diglycerides, lysophospholipids, phospholipids, galactolipids, and sucrose esters of fatty acids.

In one embodiment a creamer composition according to the invention is free from added monoacylglycerols, diacylglycerols, diacetylated tartaric acid esters of monoglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, succinic acid esters of monoglycerides and diglycerides, lactic acid esters of monoglycerides and diglycerides, lysophospholipids, phospholipids, galactolipids, and sucrose esters of fatty acids. For example it may be free from added monoacylglycerols, diacylglycerols, diacetylated tartaric acid esters of monoglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, succinic acid esters of monoglycerides and diglycerides, lactic acid esters of monoglycerides and diglycerides, lysophospholipids, and sucrose esters of fatty acids.

Advantageously, the liquid creamer of the invention is stable without requiring pH buffering ingredients that may be badly perceived by consumers such as phosphate salts. In an embodiment the liquid creamer contains less than 0.001 wt. % (for example less than 0.0001 wt. %) phosphate salts. The liquid creamer of the invention may be free from added phosphate salts, for example the liquid creamer of the invention may be free from phosphate salts. Phosphate salts include monosodium phosphate, monopotassium phosphate, disodium phosphate, dipotassium phosphate, trisodium phosphate, tripotassium phosphate, sodium hexametaphosphate, potassium hexametaphosphate, sodium tripolyphosphate, potassium tripolyphosphate, sodium pyrophosphate, potassium pyrophosphate, sodium hexametaphosphate and potassium hexametaphosphate. In one embodiment a creamer composition according to the invention is free of added monosodium phosphate, monopotassium phosphate, disodium phosphate, dipotassium phosphate, trisodium phosphate, tripotassium phosphate, sodium hexametaphosphate, potassium hexametaphosphate, sodium tripolyphosphate, potassium tripolyphosphate, sodium pyrophosphate, potassium pyrophosphate, sodium hexametaphosphate and potassium hexametaphosphate.

The combination of gellan gum and pea protein provides a liquid creamer composition which is stable without the addition of further gums such as acacia gum and guar gum. This is advantageous as consumers desire products with short lists of ingredients. In an embodiment, the liquid creamer of the invention contains less than 0.001 wt. % polysaccharides other than gellan gum, for example less than 0.0001 wt. % polysaccharides other than gellan gum. The liquid creamer of the invention may be free from added polysaccharides other than gellan gum, for example it may be free from polysaccharides other than gellan gum. In the context of the present invention the term polysaccharide refers to saccharide polymers of more than 10 monosaccharide units.

Gellan gum is a water-soluble anionic polysaccharide obtainable by production from the bacterium *Sphingomonas elodea*. In an embodiment, the gellan gum is high acyl gellan gum. High acyl gellan gum provides a desirable rheology of the liquid creamer and a good emulsion stability.

The citrate according to the liquid creamer of the invention may be provided in the form of a salt selected from the group consisting of potassium citrate, sodium citrate, calcium citrate, magnesium citrate and combinations of these. The citrate according to the liquid creamer of the invention may be provided in the form of citric acid, for example comprised within citrus juice such as lemon juice. The bicarbonate according to the liquid creamer of the invention may be provided in the form of a salt selected from the group consisting of potassium bicarbonate, sodium bicarbonate and combinations of these. In an embodiment, the citrate is provided in the form of potassium citrate and the bicarbonate is provided in the form of sodium bicarbonate (baking soda).

In an embodiment the oil is selected from the group consisting of coconut oil, high oleic canola oil, high oleic soybean oil, high oleic sunflower oil, high oleic safflower oil and combinations of these. For example the oil may be selected from the group consisting of coconut oil, high oleic canola oil, high oleic sunflower oil, high oleic safflower oil and combinations of these. The oil according to the liquid creamer of the invention may have a solid fat content of less than 1% at 4° C. This provides good stability of the creamer emulsion at temperatures such as might be encountered in a refrigerator as solidification of the oil can lead to precipitation. The solid fat content may be measured by pulsed NMR, for example according to the IUPAC Method 2.150 (a), method without special thermal pre-treatment [International Union of Pure and Applied Chemistry, Standard Methods for the Analysis of Oils, Fats and Derivatives, $7^{th}$ Revised and Enlarged Edition (1987)]. The oil according to the invention may be selected from the group consisting of canola oil, soybean oil, sunflower oil, safflower oil, algal oil and fractions and combinations of these. High oleic oils provide health benefits due to their high content of mono-unsaturated fats and have good stability. The oil according to the invention may be selected from the group consisting of high oleic canola oil, high oleic soybean oil, high oleic sunflower oil, high oleic safflower oil, high oleic algal oil and combinations of these.

The liquid creamer of the invention may comprise a sweetener, for example a sweetener found in nature. In an embodiment, the liquid creamer comprises a sweetener selected from the group consisting of sucrose, fructose, glucose, hydrolysed starch syrup (for example with a dextrose equivalent (DE) value between 40 and 100), allulose, sorbitol, maltitol, erythritol, mogrosides, steviol glycosides and combinations of these. The liquid creamer may for example comprise a sweetener selected from the group consisting of sucrose, fructose, glucose, allulose, sorbitol, maltitol, erythritol, mogrosides, steviol glycosides and combinations of these. Sucrose may be the form of cane sugar, beet sugar or molasses; for example the sweetener according to the invention may be cane sugar, beet sugar or molasses. Fructose, glucose or sucrose may be comprised within agave syrup, accordingly the sweetener according to the invention may be agave syrup. Fructose and glucose are components of honey, accordingly the sweetener according to the invention may be honey. Sorbitol, maltitol and erythritol are found in fruits or can be produced by enzymatic reactions from natural starting materials. Mogrosides are found in monk fruit (the fruit of *Siraitia grosvenorii*). Accordingly the sweetener according to the invention may be monk fruit juice. Steviol glycosides are found in the leaves of *stevia* (*Stevia rebaudiana*). Accordingly the sweetener according to the invention may be *stevia* or an extract of *stevia*.

In an embodiment, the liquid creamer comprises between 20 and 50 wt. % of saccharides, for example saccharides having ten or fewer monosaccharide units such as maltodextrin, sucrose, lactose, fructose and glucose. For example the creamer may comprise between 20 and 50 wt. % of sucrose. In an embodiment, the liquid creamer is free from sucrose.

In an embodiment the liquid creamer is free from added solid particulate whiteners, for example the liquid creamer is free from solid particulate whiteners. The oil droplets of the liquid creamer emulsion interact with light falling on the creamer so that the creamer appears white. It is advantageous that the liquid creamer of the invention provides an emulsion that appears white and maintains its whiteness on storage without the need to add solid particulate whiteners. Emulsions that separate, cream (droplets rising to the top) or which have droplets that coalesce lose their white appearance, but the combination of pea protein, gellan gum, bicarbonate and citrate at the claimed levels provides an emulsion with good stability, maintaining its white appearance. Solid particulate whiteners such as titanium dioxide provide excellent whitening power, but are avoided by some consumers who consider them to be synthetic.

In an embodiment the liquid creamer is a shelf-stable liquid creamer, for example it may have a shelf-life of at least 6 months at 20° C. It is advantageous that the liquid creamer of the invention is stable without the need for refrigeration. It is also advantageous that the composition of the liquid creamer is able to withstand heat treatments necessary to kill or reduce spoilage organisms. In an embodiment, the liquid creamer may be an aseptically packed creamer.

An aspect of the invention provides a beverage comprising the liquid creamer of the invention, for example a coffee beverage, a tea beverage, a cocoa or chocolate beverage or a malted beverage. In an embodiment, the beverage is a ready-to-drink beverage. By a ready-to-drink beverage is meant a beverage in liquid form ready to be consumed without requiring further addition of liquid. For example the beverage of the invention may be a beverage comprising water, a beverage-forming component and a sufficient amount of the liquid creamer of the invention to provide whitening, good texture and mouthfeel.

An aspect of the invention provides a process of preparing the liquid creamer of the invention comprising; dissolving the ingredients as defined in claim 1 in hot water under agitation; sterilizing the composition using ultra-high temperature (UHT) treatment; homogenizing the composition; wherein the homogenization is performed before UHT treatment, after UHT treatment, or before and after UHT treatment. The UHT treatment may for example be a treatment of between 3 and 12 seconds at between 130 and 150° C. In an embodiment, the liquid creamer may be aseptically filled into a container, which is then aseptically sealed. The liquid creamer may be cooled before being filled into a container. For example, the aseptic filling may be performed at 0.5-10° C.

Those skilled in the art will understand that they can freely combine all features of the present invention disclosed herein. In particular, features described for the product of the present invention may be combined with the process of the present invention and vice versa. Further, features described for different embodiments of the present invention may be combined. Where known equivalents exist to specific features, such equivalents are incorporated as if specifically referred to in this specification.

Further advantages and features of the present invention are apparent from the FIGURE and non-limiting examples.

EXAMPLES

Liquid creamers were produced as below.

Example 1

30 kg sugar, 100 g pea protein (Nutralys® S85F, Roquette); 700 g sodium caseinate, 30 g high acyl gellan gum (Kelcogel® HM-P, CPKelco), 120 g sodium bicarbonate (comprising 87 g carbonate) and 300 g potassium citrate (comprising 185 g citrate) were added into 50 kg of hot water (~75° C.) under high agitation.

Next, 8 kg of high oleic soybean oil was added to the above liquids under high agitation. Then, additional water was added to adjust the total amount to 100 kg.

The liquid creamer was pre-homogenized at 135/35 bars, UHT treated for 10 sec at 140° C., homogenized at 135/35 bars, and cooled. Then the liquid creamer was aseptically filled into bottles.

1 w/w % hot (~90-95° C.) coffee solution was prepared using hard water (350 ppm calcium carbonate hardness).

The physico-chemical stability and sensory parameters of the liquid creamer and coffee beverage with added liquid creamer were judged by trained panelists.

No phase separation (creaming, de-oiling, marbling, etc.), gelation, and practically no viscosity changes were found during the storage.

Good visual appearance, whitening, mouthfeel, smooth texture and a good flavour without "off" taste was fond in beverage when liquid creamer was added to hot coffee.

Example 2

A liquid creamer was prepared as in Example 1 but using 1 kg sodium caseinate.

The physico-chemical stability and sensory of creamer and coffee beverages with added liquid creamer were judged by trained panelists. No phase separation (creaming, de-oiling, marbling, etc.), gelation were found during the storage. Good visual appearance, whitening, mouthfeel, smooth texture and a good flavour without "off" taste was fond in beverage when liquid creamer was added to coffee.

Example 3

A liquid creamer was prepared as in Example 1 but using 1.4 kg sodium caseinate.

The physico-chemical stability and sensory of creamer and coffee beverages with added liquid creamer were judged by trained panelists. No phase separation (creaming, de-oiling, marbling, etc.), gelation were found during the storage. Good visual appearance, whitening, mouthfeel, smooth texture and a good flavour without "off" taste was fond in beverage when liquid creamer was added to coffee.

Example 4 (Comparative)

A liquid creamer was prepared as in Example 1 but using 600 g sodium caseinate

The physico-chemical stability and sensory of creamer and coffee beverages with added liquid creamer were judged by trained panelists. Phase separation (creaming) was found during the storage.

Example 5 (Comparative)

A liquid creamer was prepared as in Example 1 but using 1.5 g sodium caseinate

The physico-chemical stability and sensory of creamer and coffee beverages with added liquid creamer were judged by trained panelists. No phase separation (creaming, de-oiling, marbling, etc.), gelation, and practically no viscosity changes were found during the storage. However, feathering was found when liquid creamer was added to coffee.

Example 6

A liquid creamer was prepared as in Example 2 but using 400 g pea proteins.

The physico-chemical stability and sensory of creamer and coffee beverages with added liquid creamer were judged by trained panelists. No phase separation (creaming, de-oiling, marbling, etc.), gelation were found during the storage. Good visual appearance, whitening, mouthfeel, smooth texture and a good flavour without "off" taste was fond in beverage when liquid creamer was added to coffee.

Example 7 (Comparative)

A liquid creamer was prepared as in Example 2 but with 50 g pea proteins.

The physico-chemical stability and sensory of creamer and coffee beverages with added liquid creamer were judged by trained panelists. Phase separation (creaming, de-oiling, marbling, etc.), gelation were found during the storage.

Example 8 (Comparative)

A liquid creamer was prepared as in Example 2 but with 500 g pea proteins.

The physico-chemical stability and sensory of creamer and coffee beverages with added liquid creamer were judged by trained panelists. No phase separation (creaming, de-oiling, marbling, etc), gelation were found during the storage. However, bitterness and beany off flavour as well as feathering were found when liquid creamer was added to coffee.

Example 9 (Comparative)

A liquid creamer was prepared as in Example 2 but using 20 g high acyl gellan gum.

The physico-chemical stability and sensory of creamer and coffee beverages with added liquid creamer were judged by trained panelists. Phase separation (creaming) was found during the storage.

Example 10 (Comparative)

A liquid creamer was prepared as in Example 2 but using 50 g high acyl gellan gum.

The physico-chemical stability and sensory of creamer and coffee beverages with added liquid creamer were judged by trained panelists. Creamer gelation was found during the storage.

Example 11

A liquid creamer was prepared as in Example 2 but using 800 g micellar casein instead of sodium caseinate.

The physico-chemical stability and sensory of creamer and coffee beverages with added liquid creamer were judged by trained panelists. No phase separation (creaming, de-oiling, marbling, etc.), gelation were found during the storage. Good visual appearance, whitening, mouthfeel, smooth texture and a good flavour without "off" taste was fond in beverage when liquid creamer was added to coffee.

Example 12

Liquid creamers were prepared as in Example 2 but varying ratio between sodium bicarbonate and potassium citrate.

The physico-chemical stability and sensory of creamer and coffee beverages with added liquid creamer were judged by trained panelists. Results of the evaluation are shown in FIG. 1. Regions A, B, C and F were unacceptable. Region A, where potassium citrate was >0.4 wt. % (citrate>0.24 wt. %) showed bitter and chemical off flavours. Region B, where sodium bicarbonate was <0.1 wt. % (bicarbonate was <0.07 wt. %) gave a sour off flavour note. Region C had a sour flavour note coupled with feathering caused by water hardness and low pH. Region F, where potassium citrate<0.3.8 wt. % showed feathering defects due to water hardness. Good results were obtained in region D and E, with the best results being in region D.

Good physico-chemical stability of liquid creamers as well as good visual appearance, whitening, mouthfeel, smooth texture and a good flavour without "off" taste were found in beverage when liquid creamer was added to coffee, for the following combination of sodium bicarbonate and potassium citrate ranging from 0.1 to 0.2 and from 0.3 to 0.4 w/w %, respectively, that is bicarbonate and citrate ranging from 0.07 to 0.3.5 and from 0.3.8 to 0.24 w/w %, respectively.

An especially good combination of sodium bicarbonate and potassium citrate was found ranging from 0.1 to 0.3.5 and from 0.3 to 0.4 w/w %, respectively, that is bicarbonate and citrate ranging from 0.07 to 0.3.1 and from 0.3.8 to 0.24 w/w %, respectively.

The invention claimed is:

1. A liquid creamer comprising casein based protein, pea protein, gellan gum, bicarbonate, citrate and oil, wherein:
   the casein based protein is present at a level between 0.7 and 1.4%;
   the pea protein is present at a level between 0.07 and 0.4%;
   the gellan gum is present at a level between 0.025 and 0.045%;
   the bicarbonate is present at a level between 0.1 and 0.2%;
   the citrate is present at a level between 0.3 and 0.4%; and
   the oil is present at a level between 6 and 12%;
   all percentages being as a weight percentage of the liquid creamer.

2. The liquid creamer according to claim 1 wherein the casein based protein is selected from the group consisting of caseinate, micellar casein and combinations of these.

3. The liquid creamer according to claim 1 which contains less than 0.001 wt. % monoacylglycerols, diacylglycerols and diacetylated tartaric acid esters of monoglycerides.

4. The liquid creamer according to claim 1 which contains less than 0.001 wt. % phosphate salts.

5. The liquid creamer according to claim 1 which contains less than 0.001 wt. % polysaccharides other than gellan gum.

6. The liquid creamer according to claim 1 wherein the gellan gum is a high acyl gellan gum.

7. The liquid creamer according to claim 1 wherein the citrate is provided in the form of potassium citrate, and the bicarbonate is provided in the form of sodium bicarbonate.

8. The liquid creamer according to claim 1 wherein the oil is selected from the group consisting of coconut oil, high oleic canola oil, high oleic soybean oil, high oleic sunflower oil, high oleic safflower oil and combinations of these.

9. The liquid creamer according to claim 1 comprising a sweetener selected from the group consisting of sucrose, fructose, glucose, allulose, sorbitol, maltitol, erythritol, mogrosides, steviol glycosides and combinations of these.

10. The liquid creamer according to claim 1 wherein the creamer is free from added solid particulate whiteners.

11. The liquid creamer according to claim 1 wherein the creamer is a shelf-stable liquid creamer.

12. A beverage comprising a liquid creamer according to claim 1.

13. A beverage which is a ready-to-drink coffee beverage, the beverage comprising a liquid creamer comprising casein based protein, pea protein, gellan gum, bicarbonate, citrate and oil wherein the casein based protein is present at a level between 0.7 and 1.4%, the pea protein is present at a level between 0.07 and 0.4%, the gellan gum is present at a level between 0.025 and 0.045%, the bicarbonate is present at a level between 0.1 and 0.2%, the citrate is present at a level between 0.3 and 0.4%, and the oil is present at a level between 6 and 12%, all percentages being as a weight percentage of the liquid creamer.

14. A process of preparing a liquid creamer, the process comprising:

dissolving casein based protein, pea protein, gellan gum, bicarbonate, citrate and oil in hot water under agitation to form a composition, wherein the casein based protein is present at a level between 0.7 and 1.4%, the pea protein is present at a level between 0.07 and 0.4%, the gellan gum is present at a level between 0.025 and 0.045%, the bicarbonate is present at a level between 0.1 and 0.2%, the citrate is present at a level between 0.3 and 0.4%, and the oil is present at a level between 6 and 12%, all percentages being as a weight percentage of the liquid creamer;

sterilizing the composition using ultra-high temperature (UHT) treatment;

homogenizing the composition; and wherein the homogenization is performed before the UHT treatment, after the UHT treatment, or before and after the UHT treatment.

15. The process according to claim 14 wherein the liquid creamer is aseptically filled into a container, which is then aseptically sealed.

16. The liquid creamer according to claim 1 wherein the bicarbonate is 0.1 to 0.15 w/w % of the liquid creamer.

17. The beverage according to claim 13 wherein the bicarbonate is 0.1 to 0.15 w/w % of the liquid creamer.

18. The process according to claim 14 wherein the bicarbonate is 0.1 to 0.15 w/w % of the liquid creamer.

\* \* \* \* \*